April 14, 1964   W. P. AMBROGI ETAL   3,129,066
MIXER-SETTLER APPARATUS
Filed April 18, 1961   2 Sheets-Sheet 1

April 14, 1964 W. P. AMBROGI ETAL 3,129,066
MIXER-SETTLER APPARATUS
Filed April 18, 1961 2 Sheets-Sheet 2
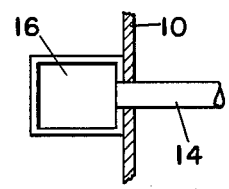
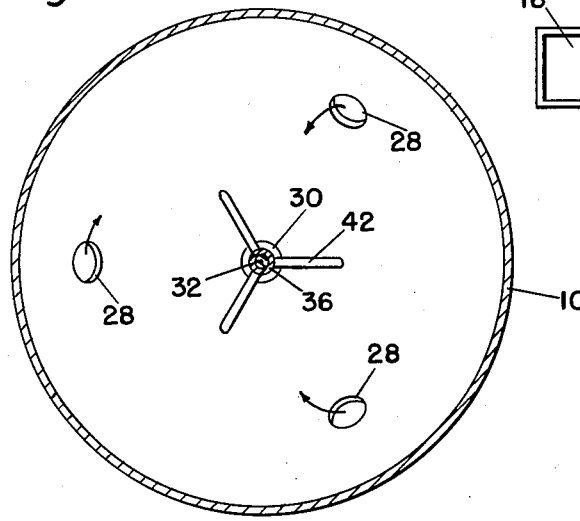
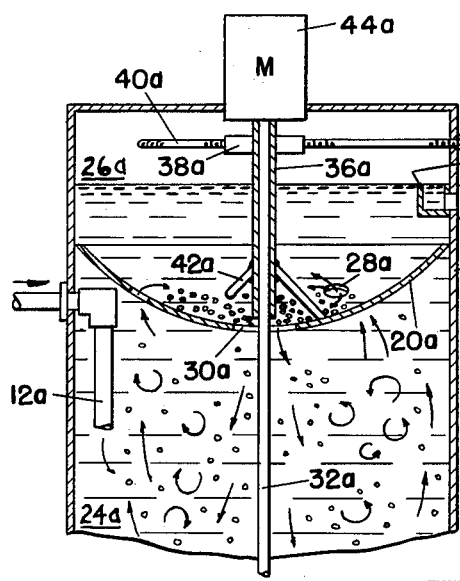
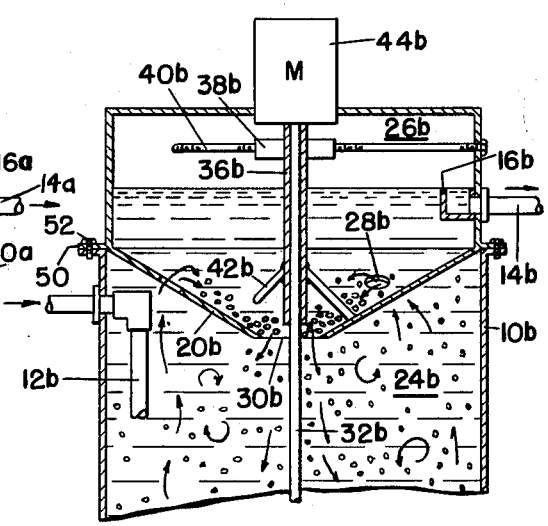
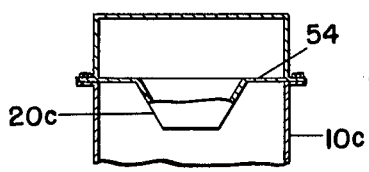

United States Patent Office 3,129,066
Patented Apr. 14, 1964

3,129,066
MIXER-SETTLER APPARATUS
William P. Ambrogi and David O. Nicodemus, Philadelphia, Pa., assignors to Rohm & Haas Company, Philadelphia, Pa., a corporation of Delaware
Filed Apr. 18, 1961, Ser. No. 103,829
9 Claims. (Cl. 23—288)

This invention relates to a mixer-settler apparatus.

In particular, it has reference to such apparatus as can be adapted for use in separating solid material from a liquid carrier therefor so as to retain the solids in a receptacle into which new liquid is constantly being admitted and from which a liquid is constantly being drawn off. More specifically, it refers to an apparatus which is applicable to the separation of solids from liquids whose respective physical properties are such as will facilitate the separation of one from the other in a practical manner through the action of gravity.

Briefly stated, the preferred embodiment of this invention essentially comprises a settling cone which is adapted, either alone or in conjunction with other structure, to fill the entire cross section of a reaction chamber, tank or vessel, in which insoluble matter, such as a solid catalyst, is vigorously stirred into intimate contact with a liquid. In this form of the apparatus the stirring is such as to cause a downward flow in the central region below the settling cone. At the end of its downward flow, the solid-liquid mixture then moves in a lateral and upward direction so as to course through one or more openings in the wall of the settling cone spaced from the centralized return opening(s) in the apex of the cone.

Inside the cone, whose apex is directed downward and which has at least one opening that connects it with the reaction chamber's turbulent zone below, there is a calm zone in which the liquid and solids are in a substantially placid and unruffled condition. In this calm zone the liquid, which by this time will have undergone whatever chemical or physical changes were to have been brought about by mixing in the turbulent zone below, rises to a level where it can pass out of the reactor through one or more openings in the wall thereof. The heavier, solid material, in the meantime, gravitates to the opening in the apex of the cone, passing through it and into the turbulent reaction zone below for further use.

In an alternate form of the invention the cone is in the lower part of the reaction vessel, with its apex directed upward. This modification, which will be described more fully below, makes possible the separation of solids and liquids from a mixture in which the solids are lighter in weight than the liquid, and separation is therefore made possible by the solids floating upwards as the liquid is drawn off below.

The invention will readily be understood by reference to the drawings in which:

FIG. 2 is a top plan view of the same apparatus taken from line 2—2 of FIG. 1;

FIG. 3 shows a constructional detail of the outlet from the reaction chamber, said view being taken along line 3—3 of FIG. 1;

FIG. 4 shows an optional construction in which the settling cone is a separate entity and is detachably secured to a reaction chamber;

FIG. 5 is another variation of the FIG. 1 design in which, instead of a cone with a straight sidewall, the separator has a rounded bottom;

FIG. 6 is another variation of the FIG. 1 design in which the cone is dependent from a plate-like member that extends inwardly from the walls of the reaction vessel rather than having the cone secured directly to the chamber walls;

For convenience of reference in describing the manner in which the present invention is constructed and operated, mention will hereinafter be made of one of the many chemical processes and other treatments which can be carried out with the novel apparatus, namely the continuous manufacture of alkylphenols. It is well known to make alkylphenols by the batchwise reaction of phenol and an olefin in the presence of a suitable catalyst. In the past, for many years, catalysts such as boron trifluoride were employed. Recently, it was discovered that certain solid materials, such as ion exchange resins, would function even more successfully as catalysts in this type of reaction, the quality of the product and the economics of the process making the use of such catalysts far more attractive than any heretofore employed for the purpose. One drawback to an otherwise highly attractive commercial process exists, namely the lack of a satisfactory continuous reaction system to replace the batchwise method. The major obstacle to the adoption of a continuous reaction is the need to separate the relatively expensive ion exchange resins or other solid catalysts from the reaction liquor for subsequent recycle, without suffering any material losses of the beads by their flow out of the reaction vessel along with the products of the reaction.

Figure 1:
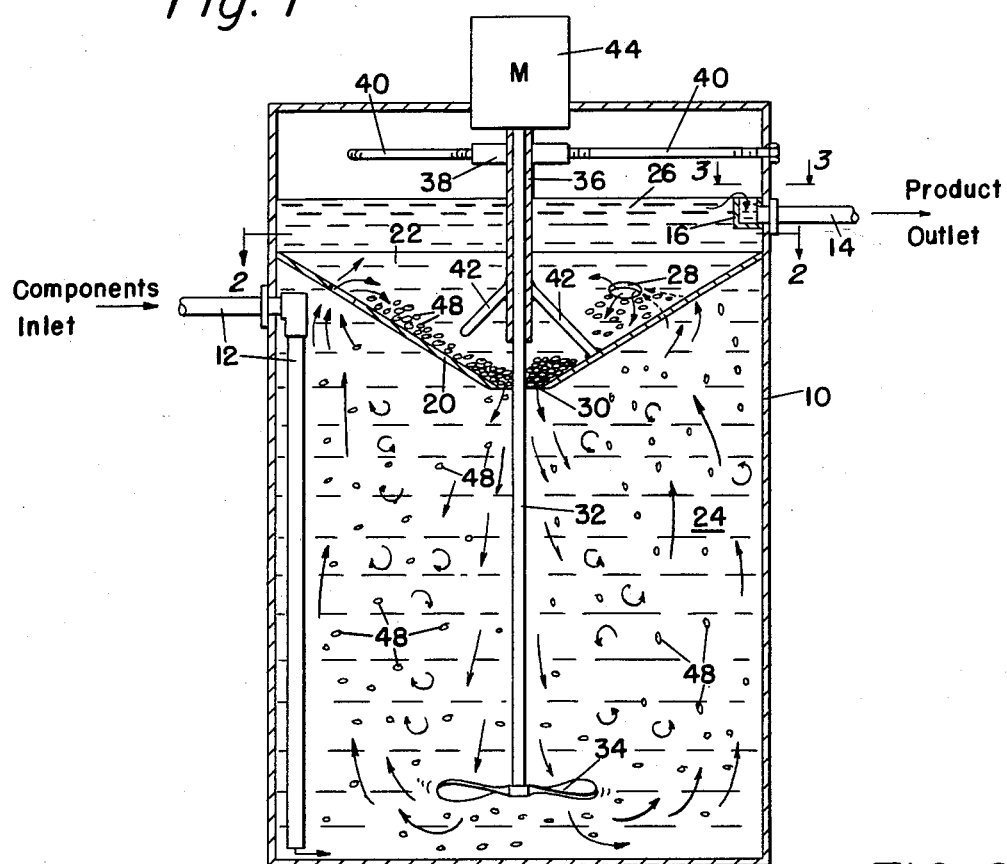
FIG. 1 is a vertical, cross-sectional view of a reaction chamber incorporating one form of the novel apparatus of the present invention.

In the drawings, there will be seen a reactor or other vessel 10. A feed pipe 12 is provided for admitting the liquid components to be reacted into the reaction vessel, preferably directing the liquids to the bottom thereof. The entrance of this pipe into the vessel can be located in the upper region of the reaction vessel with an extension inside leading to near the vessel's bottom (as shown in FIG. 1), or it could be located near the bottom of the vessel (not shown) and thus need no such extension.

An outlet including a pipe 14, used for withdrawing the product of the reaction, is provided near the top of the reaction vessel. Optionally, a cup-like shield 16, whose function will be explained later, is provided inside the vessel adjoining the opening through the vessel wall which leads to outlet 14.

A cone 20 having at least one opening 28 through its wall, at a point spaced some distance from the cone's apex, is securely attached inside vessel 10 so that the base 22 thereof completely fills the cross sectional area of the vessel, preferably near the top thereof but in any event at a point below cup 16 and outlet 14. The base of the cone is so fixed with reference to the vessel that the contents in the turbulent mixing zone 24 of the vessel can get by the cone into the calm zone 26 only by passing through one of the openings 28.

At the apex of cone 20, which is lower than the cone's base and is directed downward into reaction vessel 10, there is at least one opening 30, which serves to connect the turbulent mixing zone 24 with the calm zone 26.

In reaction vessels of the type described it is generally necessary to provide forced agitation. Although there are a number of ways in which this can be done, one of the simpler methods is to use a motor-driven propeller. Since the illustrated novel apparatus of this invention has the centrally located opening 30 in the cone, it is a simple expediency to extend a shaft 32 carrying one or more propellers 34 down through that opening. A sleeve 36 surrounds shaft 32 to minimize any agitation from the shaft in the calm zone 26. The sleeve is anchored in fixed position by means of a collar 38 that is in turn secured to the wall of the vessel with the aid of radially extending arms 40. Similar supporting members 42, which are attached at one end to the wall to the cone and at the other end to the sleeve, also help to anchor the sleeve in position. A motor 44 is employed to drive shaft 32 and propeller 34.

In the illustrative reaction, the phenol and olefin are fed through pipe 12 in a continuous stream to the bottom of reaction vessel 10. The acid catalyst, in this case solid ion exchange resin beads 48, is placed into the vessel in any convenient manner as by pouring down through opening 30 in cone 20. Optionally, of course, means in the form of liquid-tight doors or valves may be provided elsewhere in the vessel walls for admission of such materials. Not shown, only so as not to complicate the drawings any more than necessary, are means for heating or cooling the reactants in the vessel. Such means, for example, suitably could take the form of heat exchangers in the form of coils either inside or surrounding the outside of the vessel and bearing hot or cold liquids or gases.

With the reactants in the vessel, and the components under proper temperature conditions, motor 44 can be turned on and through means of shaft 32 and propeller 34 the reactants can be as vigorously mixed as is necessary to bring about the desired condition for reaction. As this agitation of the solid-liquid mixture in the vessel continues, the contents are forced radially outward and upwards towards the top of the vessel. Since there is no other way for the contents to get past the cone except through lateral openings 28 in the wall thereof, when there is sufficient force present to accomplish it a constant stream of the solid-liquid mixture makes its way through those openings into the calm zone 26. Because of the downward pumping action in the region below the apex of the cone no part of the solid-liquid mixture can pass upward through opening 30 in the cone.

No matter how forcefully the contents in the vessel's turbulent zone 24 are agitated, once the contents work through cone openings 28 into the vessel's calm zone 26 they lose their agitated condition and form a rather placid lake. The undersides of the cone act to break up the turbulence of the contents in zone 24, before the solid-liquid mixture enters the upper calm zone 26.

In the calm zone 26 the solid material 48 has a chance to settle by virtue of its greater density than the liquid. Since the liquid matter is continuously being fed into the system through pipe 12, the product of the reaction, the liquid matter in zone 26, is under constant compulsion to leave the chamber through outlet 14. In so leaving, the liquid is practically devoid of any of the solid material, as there is no longer the tremendous agitation to cause the solids to flow out with the liquid from zone 26. Instead, the solids fall to the bottom of cone 20 and slip back through opening 30 into vessel zone 24 again.

The device is such as to permit high pressure operation and control without the problems ordinarily encountered with solid-liquid systems in controlling the pressure differential between the reaction and subsequent equipment by means of a control valve or other flow-constricting devices. By internal separation of the solid and liquid phases, and by retention of the solids within the reactor the design of a high pressure reaction system is greatly simplified.

Another advantage of the novel apparatus is that several such devices can be connected in series to form a more complex reactor system. Internal separation of the solid catalyst permits direct connection of similar devices which may contain different types of catalyst.

Those persons skilled in the art of chemical manufacturing processes will readily recognize that the present invention will have applications in many catalytic and other types of operations. They will also appreciate that numerous variations may be made to the physical design and other details of the apparatus without departing from the spirit and scope of the invention as hereinabove described and as defined in the claims which are appended below. Thus, for example, cone 20 may be formed from many materials depending upon the nature of the chemicals which are to be reacted, stainless steel being one such material that may be employed in almost every situation. The depth of the cone from its uppermost base to its inverted apex below, and the angle at the apex of the cone can be varied to suit the needs of the user, depending upon the capacity and the height of reaction vessel 10 that are desired. By the same token the size and number of openings 28 can be regulated so as to permit an increase or decrease of the quantity and rate of passage of the solid-liquid slurry from reaction zone 24 through the calm zone 26. Again, by regulating the size of opening 30, and optionally by using more than one such opening in the vicinity of the cone's apex, the rate at which the solid material 48 in the cone can be permitted to drop back through such opening(s) into reaction zone 24 can be adjusted.

One simplified means for agitating the solid-liquid slurry is shown in the form of the motor driven propeller 34. As earlier stated, other means for agitating the slurry can be employed. The simple shaft 32 could have a multiple number of impellers. Turbine blades could be used. More than one unit for stirring the slurry could be employed, separated from each other rather than located centrally in the reaction vessel as illustrated. It is even possible to use some externally operated mixing means (not shown). The motor 44 or other means for causing agitation of the slurry in the vessel optionally can be governed by a variable speed device. In fact, almost any well known or other conceivable means for causing agitation of the slurry, and baffles or other means for directing or otherwise controlling the flow of the slurry, can be utilized. The only critical requirement is that its pattern of movement inside reaction zone 24 be such as will avoid moving the slurry upward centrally of the vessel so as to prevent it from going up through opening 30 (one or more) at the apex of the cone, and yet allow the slurry to move upward through the laterally spaced openings 28 into the calm zone 26, as described above.

Typical of some minor refinements of constructions which can suitably be employed is the cup-like or box-shaped means 16 which is shown in FIGS. 1 and 3. This is a further safeguard against the possibility that scattered solid particles 48 will somehow rise through the reaction zone 26 and enter the liquid products outlet 14. Cup 16, in effect, elevates the point at which outlet 14 is situated in the wall of vessel 10 so that the liquid must rise to a point where it overflows the lip of the cup before it can exit from the calm zone 26. If outlet 14 is placed near the very top of the vessel zone so as to give maximum height for the liquid in the calm zone 26 to fill before flowing out of the vessel, the liquid will flow out at the moment it reaches the lowermost edge of outlet 14. By means of cup 16, however, the liquid is forced to rise at least to a level higher than the uppermost edge of outlet 14, and this gives extra opportunity to stop any of the solid particles from getting into the outlet.

Figures 7, 8:
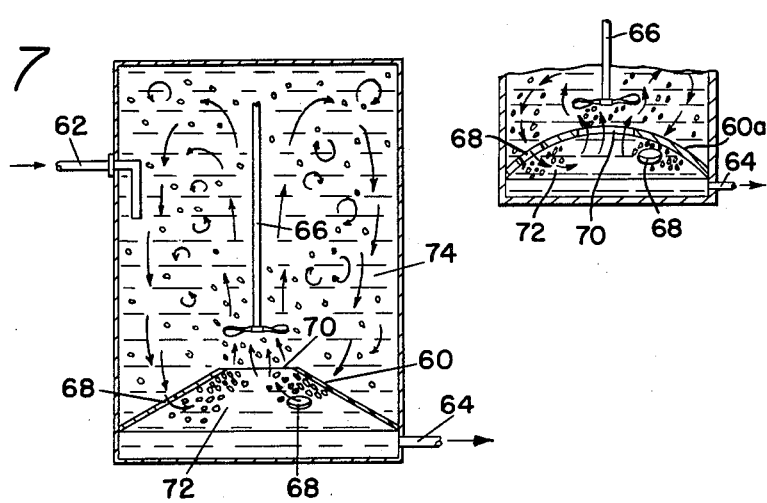
FIG. 7 is a vertical, cross-sectional view, similar to FIG. 1, but illustrating another modification of the apparatus.
FIG. 8 is a fragmentary, vertical, cross-sectional view, similar to FIG. 7, but showing a cone having an upwardly dished sidewall.

An alternate form of device for practicing the invention is schematically shown in FIGS. 7 and 8. As will be seen, cone 60 is inverted and preferably located at the lower end of the vessel. The cone may have flat sidewalls as shown in FIG. 7 or curved sidewalls as shown at 60a in FIG. 8. An inlet is provided at 62 and an exit at 64. A stirrer is represented at 66. This form of the invention is useful with liquid-solid mixtures in which the liquid is heavier than the solids. Thus, the liquid enters in the upper region of the vessel, mixes with the solid catalyst, etc., in mixing zone 74, and the liquid (including at least some of the solid matter) falls to the bottom, passing through lateral opening(s) 68 in cone 60 and out of the reactor through outlet 64. The solid particles in the mixture, being the lighter of the two, rise from within the cone and pass upward from the calm zone 72 through the central opening(s) 70 into the turbulent mixing zone 74. This cycle is then continued.

The described apparatus has many uses, such as for washing beads like ion exchange resin particles, classifying particles, and separating solid catalyst particles of various types in various processes. For purposes of illustration, the continuous catalytic methods of making alkylphenols by means of ion exchange resin catalysts has been described above. Another continuous catalytic process, based on the use of ion exchange bead catalyst, is the cracking of t-butyl acetate to form isobutylene and acetic acid.

The present invention substantially eliminates the need for the use of screens and other types of filtering devices which have commonly been used for separating solid catalysts and other materials from liquids in a reaction chamber. Such screens and filters make it practically impossible to operate such reaction systems on a continuous basis because the screens and filters become clogged with the solid material, resulting in high pressure drops. By contrast, the present invention makes such continuous separation of solids from liquids operable without any pressure drop. In fact, if desired or found necessary in certain types of chemical reactions, the reaction vessel can be closed and the entire reaction system be kept under pressure or vacuum. Thus, by operating under pressure volatile components can be kept in the liquid state, while continuously separating the liquid product from the reaction slurry and taking off the product with undiminished pressure.

It will be obvious to anyone who is at all skilled in the art that the invention can be practiced with many variations from the specifics described herein, without departing from the spirit and scope thereof. Some obvious variations have been mentioned above. Still others may briefly be mentioned by way of illustration. For example, vessel 10 need not be cylindrical; a rectangular shape, with the base 22 of cone 20 also being rectangular to fit that vessel shape, can readily be utilized. The cone need not have the straight sidewall shown in FIG. 1, but instead can have a curved sidewall like the concave shape shown at 20a in FIG. 4 or a convex curvature (not shown). Nor need the cone be an integral part of the reaction vessel. Instead, the cone can be removably attachable to the vessel, by means of a convenient flange 50 and bolts 52, as represented in FIG. 5. In fact, no such attachment is necessary, provided the cone member can be fitted snugly into a container in which mixing is to be carried on, thus making possible the portable use of the device with more than one container or reaction chamber. It is also possible that the apparatus can be employed so that vessel 10 is in a horizontal, rather than a vertical, position with the cone 20 dividing the vessel into first and second chambers.

Another modification is that shown in FIG. 6 in which cone 20c is secured by means of a circular flange-like member 54, which bridges the gap between the cone's external perimetral surface and the vessel's internal sidewall, instead of the wall 10c of the vessel. In turn, member 54 is fixed or removably secured in substantially liquid-tight relationship to the vessel 10c as shown.

With regard to the drawings, it will be understood that like numerical character references pertain to like parts. In FIGS. 4–5 the parts identified by numerals have a further identification by means of the letters "a" and "b" in order to indicate that they pertain to a device which is a partial modification of the FIG. 1 apparatus.

We claim:

1. A continuous flow mixer-settler apparatus for separating into its components a mixture of at least one liquid and at least one solid of different densities, comprising, a vessel, a substantially dish-shaped member mounted in said vessel so that the external side of its dished surface is directed toward a first end of the vessel and the external perimetral surface of said dished member is secured in substantially liquid-tight relationship with the interior wall of the vessel so as to prevent the passage thereby of any of the components to be separated and to divide the vessel into a first chamber which contains said dished member's external surface and a second chamber which contains said dished member's internal surface, said dished member having at least one opening through its wall in the central region of its dished surface and at least one opening through its wall at a point spaced laterally a substantial distance from the central region, inlet means for continuously feeding to said vessel at least one of the components to be separated in said vessel's first chamber, outlet means for continuously removing the liquid contents of the vessel from its second chamber situated at a point in said vessel's second chamber which is a vertical distance substantially more removed from any opening in the central region of the dished surface than any opening through that surface spaced laterally therefrom so as to assure ample opportunity for the liquid and solid components to become separated as the liquid heads for the outlet means and the solid heads for any opening in the central dished surface and return to the vessel's first chamber, and mixing means spaced from any opening in said dished surface's central region and entirely operative in said first chamber for urging the components entering said first chamber to move away from any opening in said dished member's central region so that the continuously flowing contents will pass from said vessel's first chamber into its second chamber via any opening in said dished member which is spaced laterally a substantial distance from the latter's central region, whereby the solid matter in those flowing contents tends to remain in said vessel while the liquid matter flows out of said vessel's second chamber through said outlet means.

2. The apparatus of claim 1 for separating a mixture of a more dense solid from a less dense liquid in which the dish-shaped member is substantially conical with its apex comprising the central region bearing at least one opening therethrough and pointing downwardly, said conical member being mounted so as to divide the vessel into an upper chamber and a lower chamber, the inlet means making possible the continuous feeding to said vessel of at least one of the components to be separated in the lower chamber, the outlet means enabling the continuous removal of the liquid contents of the vessel from the upper chamber, the mixing means urging the contents in the lower chamber away from any opening in the apex of the conical member so that the continuously flowing contents in the vessel pass up and through any opening which is laterally spaced a substantial distance from said apex into the vessel's upper chamber, whereby the more dense solid matter in those flowing contents settles through gravity back down through any opening in said conical member's apex and the less dense liquid continues flowing up and out of the vessel's upper chamber via said outlet means.

3. The apparatus of claim 2 in which the conical member has a curved instead of a straight interior sidewall, all of whose parts lead downward to a substantially apical juncture, the openings through the walls of this conical member being substantially in the same locations and number as in the straight sidewall conical member.

4. The apparatus of claim 1 for separating a mixture of a more dense liquid from a less dense solid in which the dish-shaped member is substantially conical with its apex comprising the central region bearing at least one opening therethrough and pointing upwardly, said conical member being mounted so as to divide the vessel into an upper chamber and a lower chamber, the inlet means making possible the continuous feeding to said vessel of at least one of the components to be separated in the upper chamber, the outlet means enabling the continuous removal of the liquid contents of the vessel from the lower chamber, the mixing means urging the contents in the upper chamber away from any opening in the apex of the conical member so that the continuously flowing contents in the vessel pass down and through any opening which is laterally spaced a substantial distance from said apex into the vessel's lower chamber, whereby the less dense solid matter in those flowing contents rises and passes through any opening in said conical member's apex into the reaction chamber while the more dense liquid continues flowing down and out of the vessel's lower chamber via said outlet means.

5. The apparatus of claim 4 in which the conical member has a curved instead of a straight interior sidewall, all of whose parts lead upward to a substantially apical juncture, the openings through the walls of this conical member being substantially in the same locations and number as in the straight sidewall conical member.

6. An apparatus for conducting a continuous catalytic reaction involving the mixing of a solid catalyst, which is constantly recovered inside the apparatus and reused, together with less dense liquid reactants which are converted to a liquid product that is separated from the catalyst and withdrawn from the reactor, comprising, a reaction vessel, a substantially conical member mounted so that its apex is directed downwardly and its base helps to form a substantially liquid-tight seal with the interior wall of said vessel so as to divide the vessel into a lower turbulent reaction zone and an upper calm settling zone, said conical member having at least one opening through its wall at a point spaced a substantial distance laterally from its apex through which the contents of the reaction zone can pass into the settling zone and having at least one opening through its wall in the region of its apex through which the solid catalyst may be admitted from the settling zone into the reaction zone, inlet means for continuously feeding the liquid reactants to said vessel's reaction zone, outlet means for continuously removing the reaction products from said vessel from a location in the upper settling zone which is substantially higher than any opening through the wall of said conical member so as to assure ample opportunity for the liquid and solid components to become separated as the liquid heads for the outlet means and the solid heads for any opening in said conical member's apex and return to the reaction zone, and mixing means spaced from any opening in said conical member's apex and entirely operative in the reaction zone for urging the mixture of solid catalyst and liquid reactants in the reaction zone radially toward the vessel wall and away from the apex of said conical member, so that the continuously flowing mixture passes up and through any opening through the wall of that member other than any opening through that member's apex and into the vessel's settling zone, whereby the more dense catalyst in the upwardly flowing mixture settles through gravity back down through any opening in said conical member's apex into the vessel's reaction zone and the less dense liquid reaction product continues flowing up and out of the vessel's settling zone via said outlet means.

7. The apparatus of claim 6 in which the conical member has a curved instead of a straight sidewall, all of whose parts lead downward to a substantially apical juncture, the openings through the wall of this conical member being substantially in the same location and number as in the straight sidewall conical member.

8. An apparatus for conducting a continuous catalytic reaction involving the mixing of a solid catalyst, which is constantly recovered inside the apparatus and reused, together with more dense liquid reactants which are converted to a liquid product that is separated from the catalyst and withdrawn from the reactor, comprising, a reaction vessel, a substantially conical member mounted so that its apex is directed upwardly and its base helps to form a substantially liquid-tight seal with the interior wall of said vessel so as to divide the vessel into an upper turbulent reaction zone and a lower calm settling zone, said conical member having at least one opening through its wall at a point spaced a substantial distance laterally from its apex through which the contents of the reaction zone can pass down into the settling zone and having at least one opening through its wall in the region of its apex through which the less dense solid catalyst can pass from the settling zone into the reaction zone, inlet means for continuously feeding the liquid reactants to said vessel's reaction zone, outlet means for continuously removing the reaction products from said vessel's lower settling zone at a location which is substantially lower than any opening through the wall of said conical member so as to assure ample opportunity for the liquid and solid components to become separated as the liquid heads for the outlet means and the solid heads for any opening in said conical member's apex region and return to the reaction zone, and mixing means spaced from any opening in said conical member's apex region and entirely operative in the reaction zone for urging the mixture of solid catalyst and liquid reactants in the reaction zone radially toward the vessel wall and away from the apex of said conical member, so that the continuously flowing mixture passes down and through any opening through the wall of that member other than the opening through that member's apex and into any vessel's settling zone, whereby the less dense catalyst rises and passes through any opening in said conical member's apex into the vessel's reaction zone and the more dense liquid reaction product continue flowing out of the vessel's settling zone via said outlet means.

9. The apparatus of claim 8 in which the conical member has a curved instead of a straight interior sidewall, all of whose parts lead upward to a substantially apical juncture, the openings through the walls of this conical member being substantially in the same locations and number as in the straight sidewall conical member.

References Cited in the file of this patent

UNITED STATES PATENTS

| | | |
|---|---|---|
| 579,039 | Brashear | Mar. 16, 1897 |
| 1,202,356 | Blackmer | Oct. 24, 1916 |
| 1,982,002 | Hatch | Nov. 27, 1934 |
| 2,767,847 | Russell et al. | Oct. 23, 1956 |
| 2,833,630 | Lovenstein | May 6, 1958 |
| 2,904,409 | Bolstad | Sept. 15, 1959 |

FOREIGN PATENTS

| | | |
|---|---|---|
| 556,319 | Belgium | Apr. 30, 1957 |